United States Patent
Vaccaro et al.

(10) Patent No.: US 9,048,527 B2
(45) Date of Patent: Jun. 2, 2015

(54) COAXIAL CONNECTOR WITH CAPACITIVELY COUPLED CONNECTOR INTERFACE AND METHOD OF MANUFACTURE

(71) Applicant: Andrew LLC, Hickory, NC (US)

(72) Inventors: Ronald Alan Vaccaro, Shorewood, IL (US); Kendrick Van Swearingen, Woodridge, IL (US); Jeffrey D Paynter, Momence, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/074,016

(22) Filed: Nov. 7, 2013

(65) Prior Publication Data

US 2014/0134876 A1    May 15, 2014

Related U.S. Application Data

(63) Continuation-in-part of application No. 13/673,084, filed on Nov. 9, 2012, now Pat. No. 8,622,768.

(51) Int. Cl.
| | |
|---|---|
| *H01R 9/05* | (2006.01) |
| *H01Q 1/00* | (2006.01) |
| *H04B 5/00* | (2006.01) |
| *H01P 5/02* | (2006.01) |

(52) U.S. Cl.
CPC *H01Q 1/00* (2013.01); *H01P 5/026* (2013.01); *H04B 5/0012* (2013.01)

(58) Field of Classification Search
CPC .................................................. H01R 2103/00
USPC ................... 439/578, 315, 316, 317, 312, 313
See application file for complete search history.

(56) References Cited

U.S. PATENT DOCUMENTS

| | | | |
|---|---|---|---|
| 2,516,529 A | 7/1950 | Raymond | |
| 2,847,499 A | 8/1958 | Peterson | |
| 2,994,050 A | 7/1961 | Ayer et al. | |
| 3,089,105 A | 5/1963 | Alford | |
| 3,258,724 A | 6/1966 | Walsh et al. | |
| 3,309,632 A * | 3/1967 | Trudeau | 333/33 |
| 3,586,757 A | 6/1971 | Haldeman, Jr. | |
| 3,617,607 A | 11/1971 | Williams | |
| 3,970,969 A | 7/1976 | Sirel et al. | |
| 3,980,976 A | 9/1976 | Tadama et al. | |
| 4,038,625 A | 7/1977 | Tompkins et al. | |
| 4,397,515 A | 8/1983 | Russell | |

(Continued)

OTHER PUBLICATIONS

Gon Sung Kim, International Search Report for PCT/US13/069108, Mar. 10, 2014, Daejeon Metropolitan City, Republic of Korea.

(Continued)

*Primary Examiner* — Hae Moon Hyeon
(74) *Attorney, Agent, or Firm* — Babcock IP, PLLC

(57) ABSTRACT

A connector with a capacitively coupled connector interface for interconnection with a mating portion with a sidewall. A connector body has an outer conductor coupling surface at an interface end, covered by an outer conductor dielectric spacer. The outer conductor coupling surface is dimensioned to seat, spaced apart from the sidewall by the outer conductor dielectric spacer, when the connector body and the mating portion are in an interlocked position. A releasable retainer may be provided, the releasable retainer dimensioned to secure the connector body and the mating portion in the interlocked position.

18 Claims, 8 Drawing Sheets

(56) References Cited

U.S. PATENT DOCUMENTS

| | | |
|---|---|---|
| 4,399,419 A | 8/1983 | Dobrovolny |
| 4,586,008 A | 4/1986 | Raleigh |
| 4,884,982 A | 12/1989 | Fleming et al. |
| 4,943,245 A | 7/1990 | Lincoln |
| 5,073,761 A | 12/1991 | Waterman et al. |
| 5,276,415 A | 1/1994 | Lewandowski et al. |
| 5,327,111 A | 7/1994 | Gipprich |
| 5,471,222 A | 11/1995 | Du |
| 5,474,470 A | 12/1995 | Hammond |
| 5,557,290 A | 9/1996 | Watanabe |
| 5,659,889 A | 8/1997 | Cockson |
| 5,796,315 A | 8/1998 | Gordon et al. |
| 5,977,841 A | 11/1999 | Lee et al. |
| 6,414,636 B1 | 7/2002 | Godard et al. |
| 6,496,353 B1 | 12/2002 | Chio |
| 6,525,620 B1 | 2/2003 | Barabash |
| 6,683,254 B1 | 1/2004 | Gunnels |
| 6,778,044 B2* | 8/2004 | Fehrenbach et al. .......... 333/260 |
| 6,798,310 B2 | 9/2004 | Wong et al. |
| 6,853,337 B2 | 2/2005 | Barabash |
| 6,926,555 B2 | 8/2005 | Nelson |
| 7,094,104 B1 | 8/2006 | Burke et al. |
| 7,385,457 B2 | 6/2008 | Cordes et al. |
| 7,607,942 B1 | 10/2009 | Van Swearingen |
| 7,869,974 B2 | 1/2011 | Plishner |
| 8,174,132 B2 | 5/2012 | Van Swearingen |
| 8,460,031 B2 | 6/2013 | Paynter et al. |
| 8,622,768 B2* | 1/2014 | Van Swearingen et al. .. 439/578 |
| 8,711,049 B2* | 4/2014 | Fehrenbach et al. .......... 343/786 |
| 2003/0137372 A1 | 7/2003 | Fehrenbach et al. |
| 2006/0172571 A1 | 8/2006 | Montena |
| 2008/0170346 A1 | 7/2008 | Van Swearingen |
| 2010/0124838 A1* | 5/2010 | Montena et al. .............. 439/489 |
| 2010/0124839 A1 | 5/2010 | Montena |
| 2011/0003507 A1 | 1/2011 | Van Swearingen |
| 2012/0129375 A1 | 5/2012 | Van Swearingen |
| 2014/0134863 A1* | 5/2014 | Van Swearingen et al. .. 439/217 |

OTHER PUBLICATIONS

So Yeon Jeong, International Search Report of Parent Counterpart International Application No. PCT/US12/64572, Mar. 28, 2013, Daejeon Metropolitan City, Korea.

Gon Sung Kim, International Search Report for PCT/US13/59392, Dec. 23, 2013, Daejeon Metropolitan City, Republic of Korea.

* cited by examiner

COAXIAL CONNECTOR WITH CAPACITIVELY COUPLED CONNECTOR INTERFACE AND METHOD OF MANUFACTURE

CROSS REFERENCE TO RELATED APPLICATIONS

This application is a continuation-in-part of commonly owned co-pending U.S. Utility patent application Ser. No. 13/673,084, titled "CONNECTOR WITH CAPACITIVELY COUPLED CONNECTOR INTERFACE" filed 9 Nov. 2012 by Kendrick Van Swearingen, Ronald Alan Vaccaro, James P. Fleming and Jeffrey D Paynter, hereby incorporated by reference in its entirety.

BACKGROUND

1. Field of the Invention

This invention relates to electrical cable connectors. More particularly, the invention relates to connectors with capacitive coupling between signal conducting portions of the connection interface, which may be compatible with standard telescoping connector interfaces.

2. Description of Related Art

Coaxial cables are commonly utilized in Radio Frequency (RF) communications systems. Coaxial cable connectors may be applied to terminate coaxial cables, for example, in communication systems requiring a high level of precision and reliability.

Connector interfaces provide a connect/disconnect functionality between a cable terminated with a connector bearing the desired connector interface and a corresponding connector with a mating connector interface mounted on an apparatus or a further cable. Prior coaxial connector interfaces typically utilize a retainer provided as a threaded coupling nut which telescopically draws the connector interface pair into secure electro-mechanical engagement as the coupling nut, rotatably retained upon one connector, is threaded upon the other connector.

Passive Intermodulation Distortion (PIM) is a form of electrical interference/signal transmission degradation that may occur with less than symmetrical interconnections and/or as electro-mechanical interconnections shift or degrade over time, for example due to mechanical stress, vibration, thermal cycling, and/or material degradation. PIM is an important interconnection quality characteristic, as PIM generated by a single low quality interconnection may degrade the electrical performance of an entire RF system.

Recent developments in RF coaxial connector design have focused upon reducing PIM by improving interconnections between the conductors of coaxial cables and the connector body and/or inner contact, for example by applying a molecular bond instead of an electro-mechanical interconnection, as disclosed in commonly owned U.S. Patent Application Publication 2012/0129391, titled "Connector and Coaxial Cable with Molecular Bond Interconnection", by Kendrick Van Swearingen and James P. Fleming, published on 24 May 2012 and hereby incorporated by reference in its entirety.

There is a large pool of existing cables and/or equipment utilizing coaxial connectors with standardized coaxial connector interfaces, such as the 7/16 DIN connector interface or the like. It may be cost prohibitive to adopt new technologies where such would require replacement and/or re-connectorizing of existing cabling and/or equipment.

Competition in the cable connector market has focused attention on improving interconnection performance and long term reliability of the interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
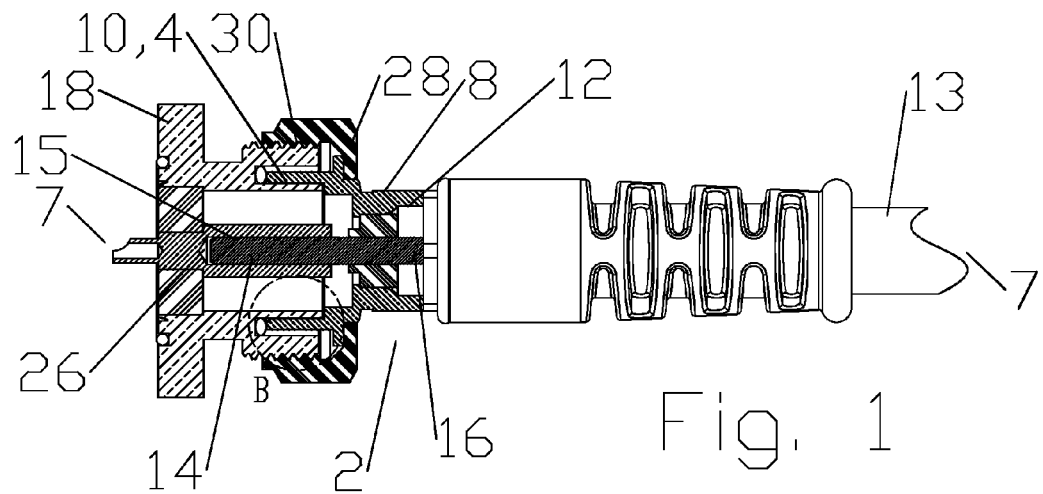
FIG. 1 is a schematic partial cutaway side view of an exemplary coaxial connector in an interlocked position with a bulkhead mount female connector receiving portion.

The inventors have recognized that PIM may be generated at, in addition to the interconnections between the inner and outer conductors of a coaxial cable and each coaxial connector, the electrical interconnections between the connector interfaces of mating coaxial connectors.

One skilled in the art will appreciate that a capacitive coupling interconnection may be optimized for a specific operating frequency band. For example, the level of capacitive coupling between separated conductor surfaces is a function of the desired frequency band(s) of the electrical signal (s), the surface area of the separated conductor surfaces, the dielectric constant of a dielectric spacer and the thickness of the dielectric spacer (distance between the separated conductor surfaces).

Capacitive coupling between spaced apart conductor surfaces eliminates the direct electrical current interconnection between these surfaces that may otherwise be subject to PIM generation/degradation.

As shown for example in FIGS. 1-4, a capacitively coupled coaxial connection interface 3 for a coaxial connector 2 applies an outer conductor dielectric spacer 4 at the interface end 6 of a connector body (here demonstrated as a male connector body 8) between each of the outer conductor coupling surfaces 10 which couple the signal path of the outer conductor 12 of a coaxial cable 13 across the connection interface 3.

Similarly, an inner conductor dielectric spacer 14 may be applied to the interface end 6 of an inner conductor coupling surface 15 of the connection interface which couples the signal path of an inner conductor 16 across the connection interface 3.

One skilled in the art will appreciate that interface end 6 and cable end 7 are applied herein as identifiers for respective ends of both the coaxial connector 2 and also of discrete elements of the coaxial connector 2 and the receiving portion described herein, to identify same and their respective interconnecting surfaces according to their alignment along a longitudinal axis of the coaxial connector 2 between an interface end 6 and a cable end 7 of each of the male connector body 8 and female connector body 18. When interconnected by via connection interface 3, the interface end 6 of the male connector body 8 is coupled to the interface end 6 of the female connector body 18.

The outer conductor dielectric spacer 4 and the inner conductor dielectric spacer 14 are insulated from the outer conductor coupling surface 10 and the inner conductor coupling surface 15, respectively, from direct contact with a mating connection interface 5 of the receiving portion.

Thereby, when the male connector body 8 is secured within a corresponding receiving portion (here demonstrated as a female connector body 18 and an inner conductor socket 26), an entirely capacitively coupled connector interface is formed. That is, there is no direct galvanic interconnection between the inner conductor or outer conductor electrical pathways across the connection interface 3.

The dielectric coatings of the outer and inner conductor dielectric spacers 4, 14 may be provided, for example, as a ceramic or polymeric dielectric material. Examples of suitable polymeric dielectric materials include glass-filled polypropylene or polycarbonate. One example of a dielectric coating with suitable compression and thermal resistance characteristics that may be applied with high precision at very thin thicknesses is ceramic or ceramic glass coatings. These coatings may be applied directly to the desired surfaces via a range of deposition processes, such as Physical Vapor Deposition (PVD) or the like. Ceramic and ceramic glass coatings have a further benefit of a high hardness characteristic, thereby protecting the coated surfaces from damage prior to interconnection and/or resisting thickness variation due to compressive forces present upon interconnection. The ability to apply extremely thin dielectric coatings, for example as thin as 0.5 microns, may reduce the surface area requirement of the separated conductor surfaces, enabling the overall dimensions of the connection interface to be reduced.

Figure 2:
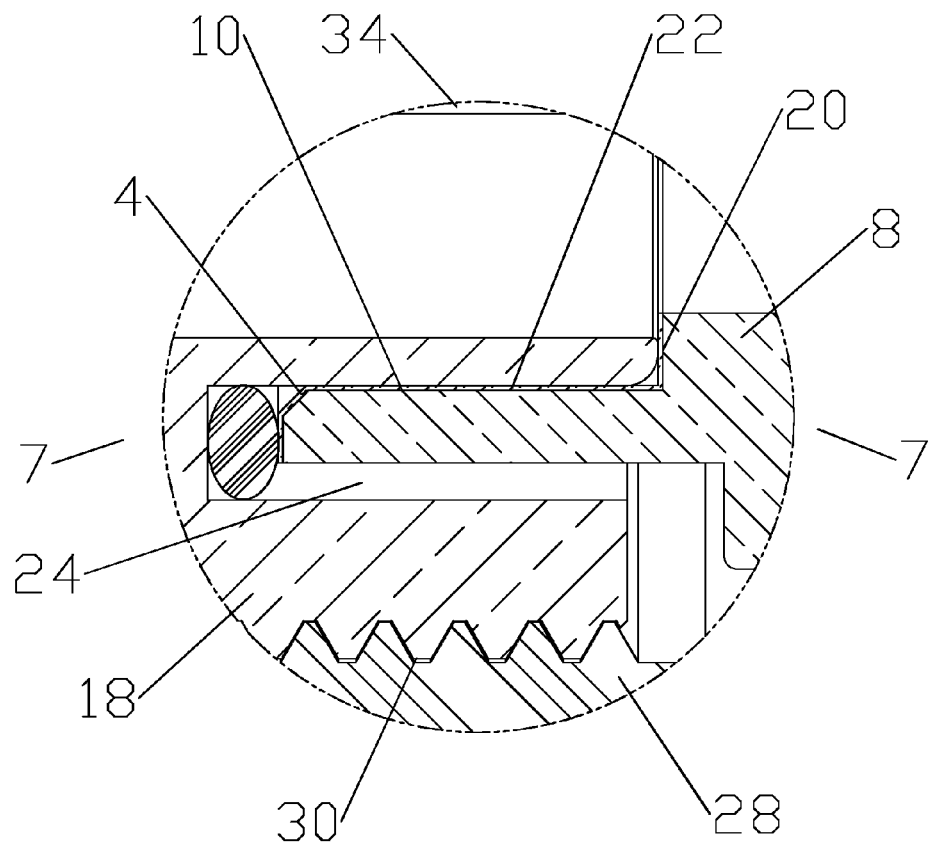
FIG. 2 is a schematic close-up view of area B of FIG. 1.

As best shown in FIG. 2, an interface shoulder 20 of the male connector body 8 provides an interconnection stop for the telescoping interconnection between the male connector body 8 and a female connector body 18. The interface shoulder 20 and an outer conductor coupling surface 10 of the male connector body 8, here the inner diameter of male connector body 8 between the interface shoulder 20 and the interface end 6 of the male connector body 8, are covered by the outer conductor dielectric spacer 4 to space the male connector body 8 apart from direct contact with an inner sidewall 22 of an annular groove 24 of the female connector body 18.

The inner conductor dielectric spacer 14 spaces the inner conductor coupling surface 15 of the coaxial connector 2, such as a portion of the inner conductor 16, an inner conductor cap or inner conductor contact coupled to the inner conductor, apart from direct contact with the inner conductor coupling surface 15 of the receiving portion, here an inner conductor socket 26.

Figure 3:
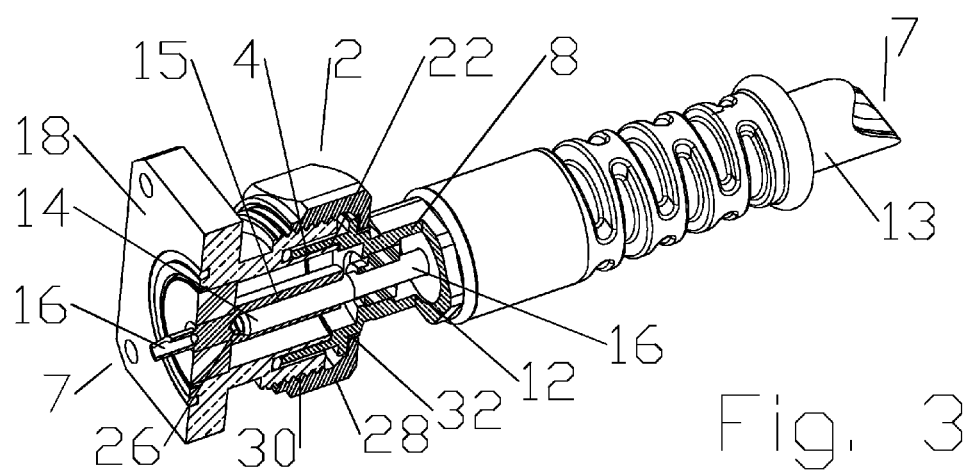
FIG. 3 is a schematic isometric partial cutaway view of an alternative coaxial connector in an interlocked position with a bulkhead mount female connector receiving portion.
Figure 4:
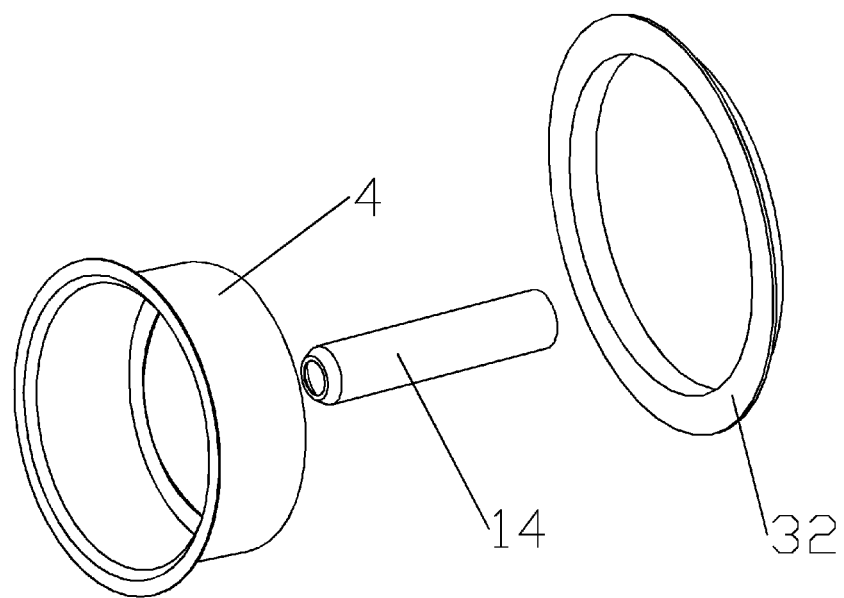
FIG. 4 is a schematic isometric view of the dielectric spacers of the coaxial connector of FIG. 3.
Figures 5, 6:
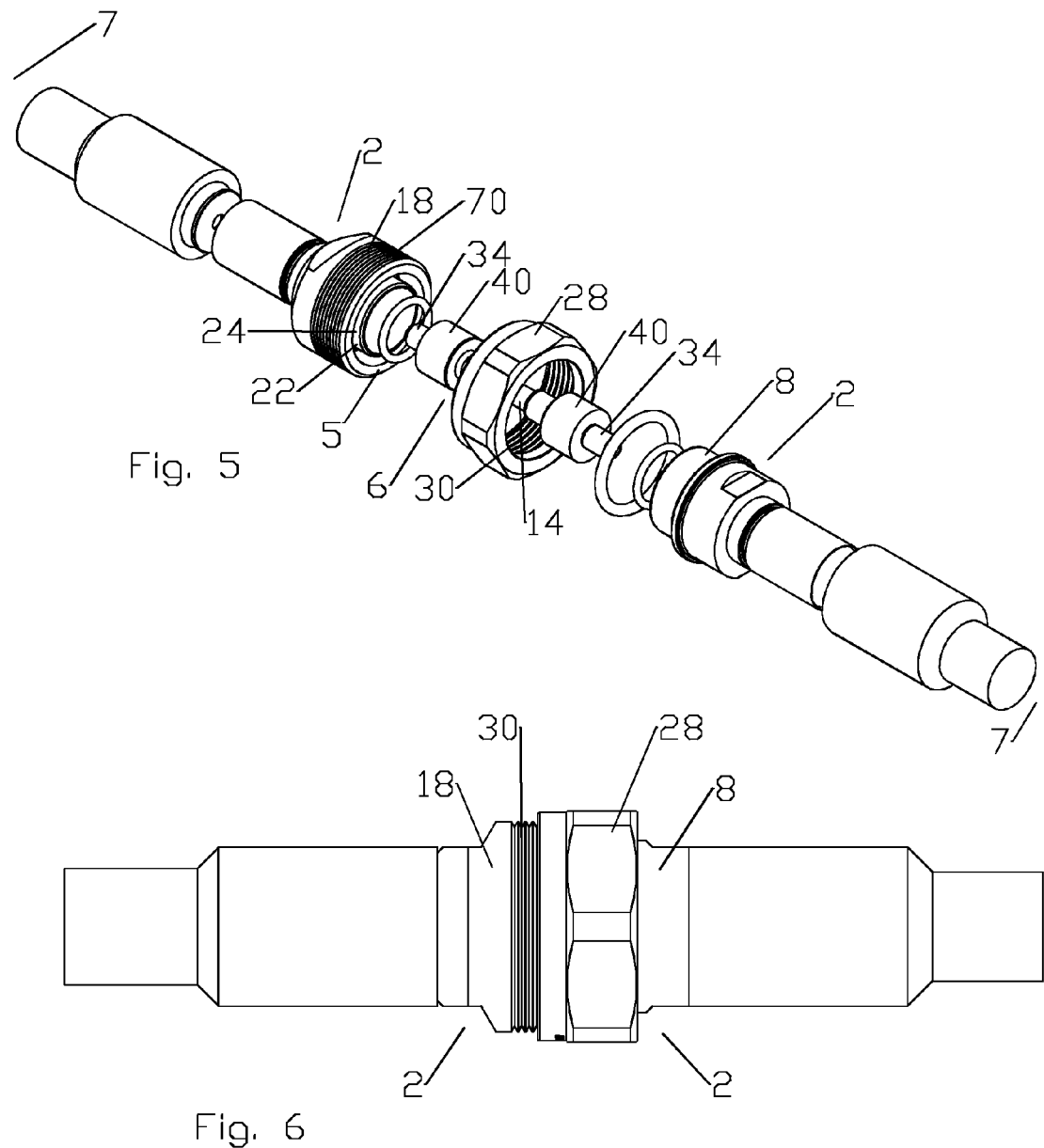
FIG. 5 is a schematic isometric exploded view of elements of another alternative coaxial connector and a female connector receiving portion.
FIG. 6 is a schematic side view of the coaxial connector and receiving portion of FIG. 5, in the interlocked position.
Figure 7:
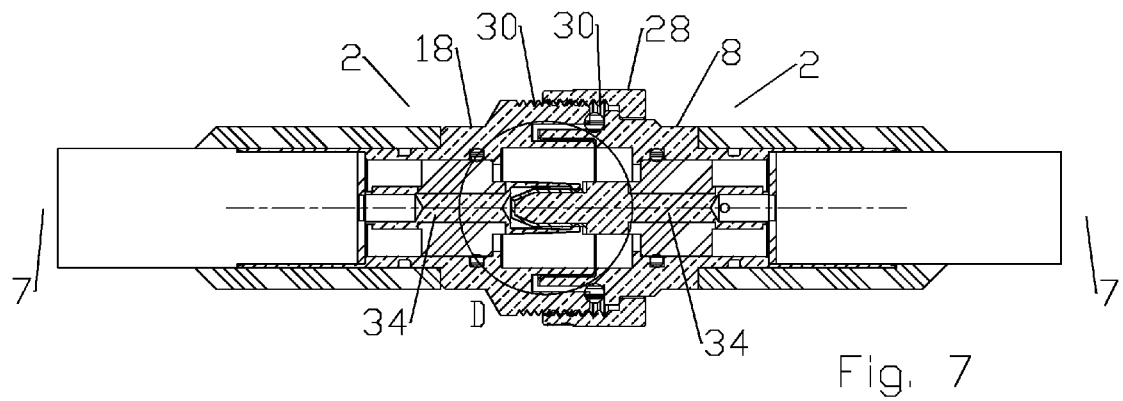
FIG. 7 is a schematic cutaway side view of the coaxial connector and receiving portion of FIG. 6.
Figure 8:
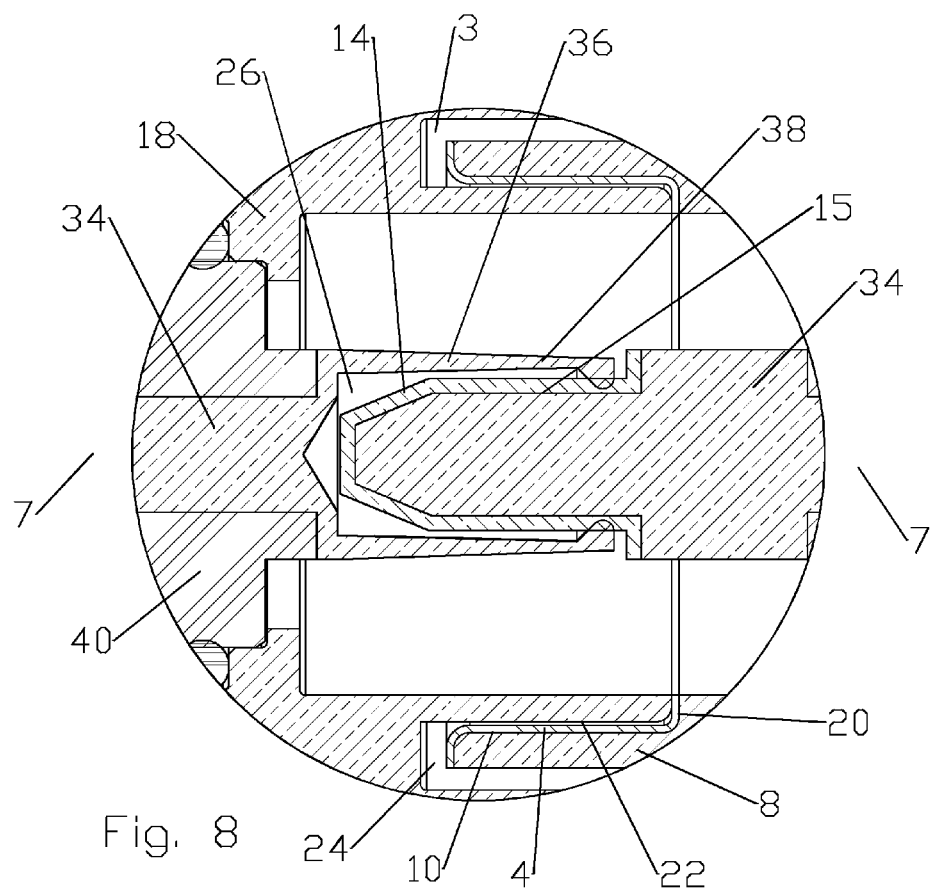
FIG. 8 is a close-up view of area D of FIG. 7.
Figure 9:
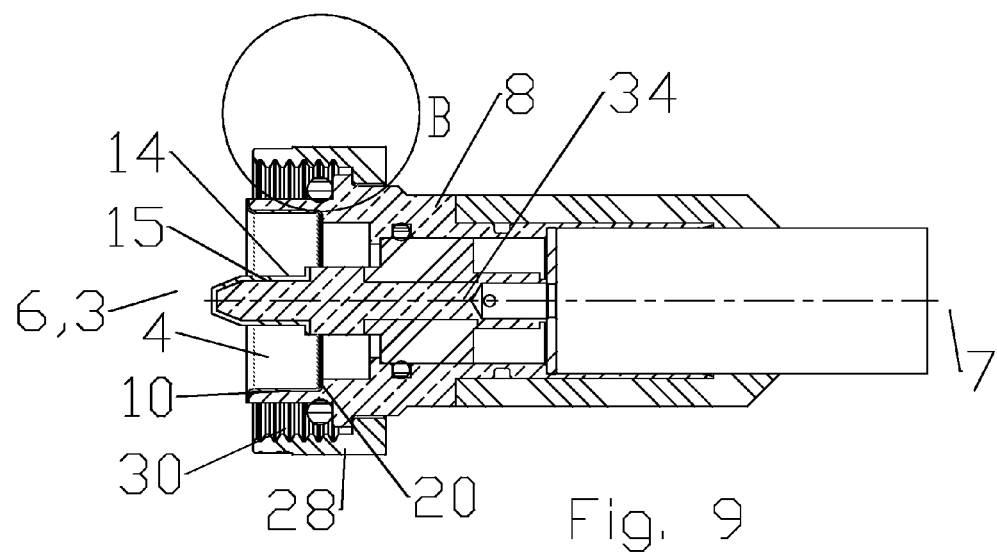
FIG. 9 is a schematic cutaway side view of another alternative coaxial connector, with a polymeric releasable retainer.
Figure 10:
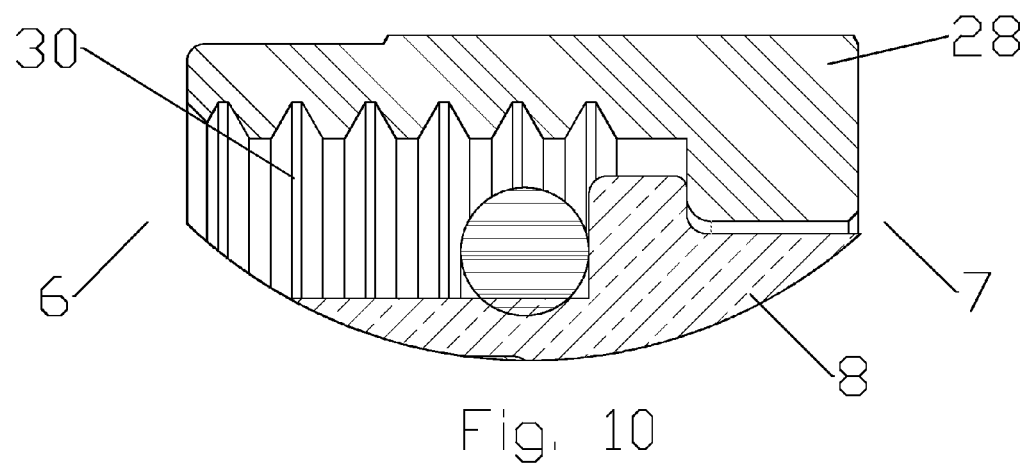
FIG. 10 is a schematic close-up view of area B of FIG. 9.
Figure 11:
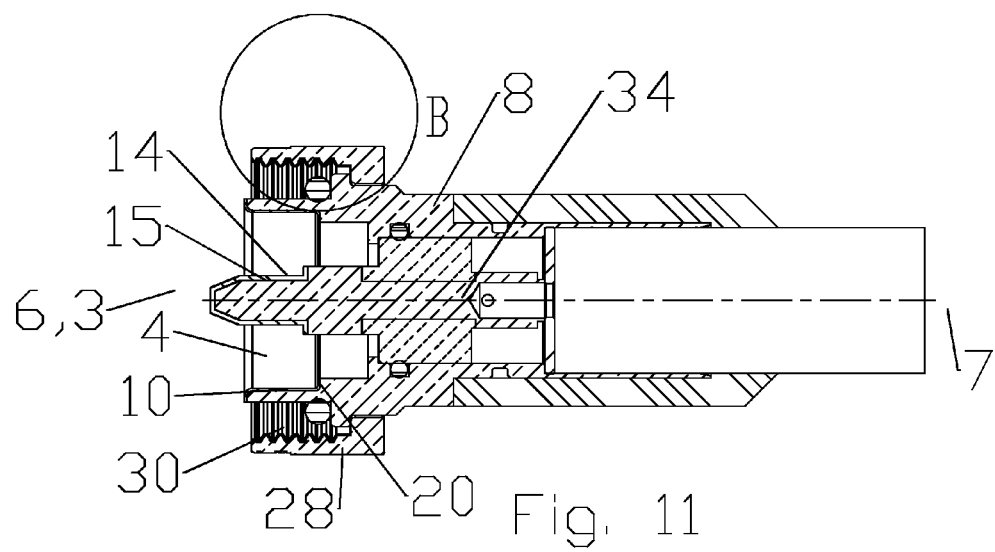
FIG. 11 is a schematic cut-away side view of another alternative coaxial connector with a retainer dielectric coating provided on the threads of the releasable retainer.
Figure 12:
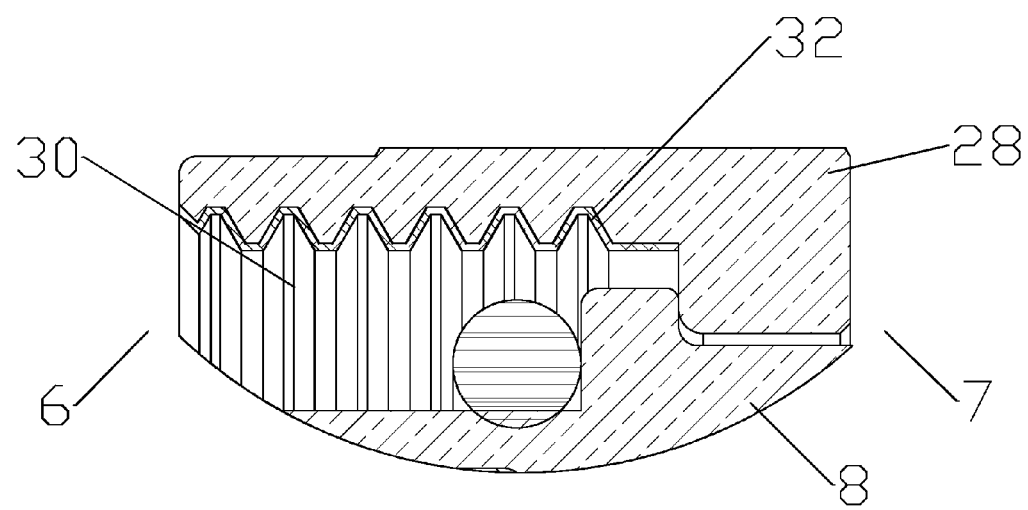
FIG. 12 is a schematic close-up view of area B of FIG. 11.

The telescopic mating between the male connector body 8 and the female connector body 18 of the exemplary embodiments are secured by a releasable retainer 28. The releasable retainer 28 may be formed from a dielectric material, for example a fiber reinforced polymer such as glass filled polypropylene or polycarbonate, for example as shown in FIGS. 1 and 5-10. Therefore, the releasable retainer 28 does not create a galvanic electro-mechanical coupling between the male connector body 8 and the female connector body 18.

Where the additional wear and/or strength characteristics of a metal material releasable retainer 28 are desired, for example where the releasable retainer 28 is a conventional threaded lock ring with inner diameter threads 30 that couple with corresponding outer diameter threads 30 of the female connector body 18 to draw the male and female connector bodies 8, 18 together and secure them in the interconnected position, a retainer dielectric spacer 32 may be applied, between seating surfaces of the releasable retainer 28 and the male connector body 8, to electrically isolate the releasable retainer 28 from the male connector body 8, for example as shown in FIGS. 3 and 4. Alternatively, a metallic or other conductive material releasable retainer 28 may be applied with a dielectric coating applied to the inner diameter threads 30 thereof, as shown for example in FIGS. 11 and 12.

One skilled in the art will appreciate that the capacitive coupling connector interface may be applied in embodiments compatible with existing standardized telescoping coaxial connector interfaces, such as 7/16 DIN.

Figure 13:
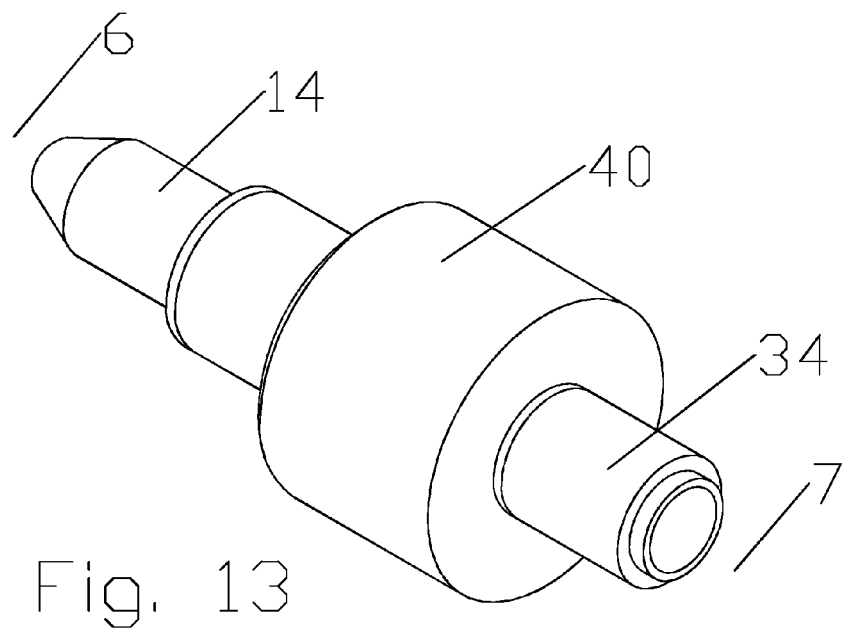
FIG. 13 is a schematic isometric view of the inner contact and insulator of the coaxial connector of FIG. 9.
Figure 14:
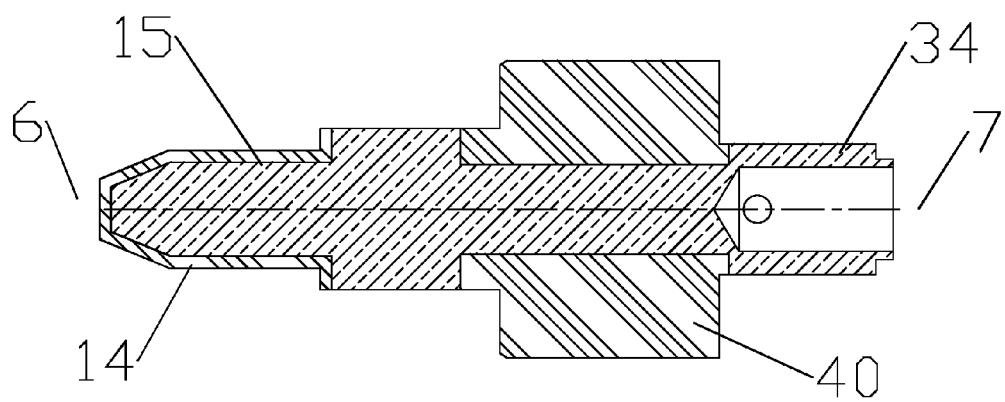
FIG. 14 is a schematic cutaway view of the inner contact and insulator of FIG. 13.
Figure 15:
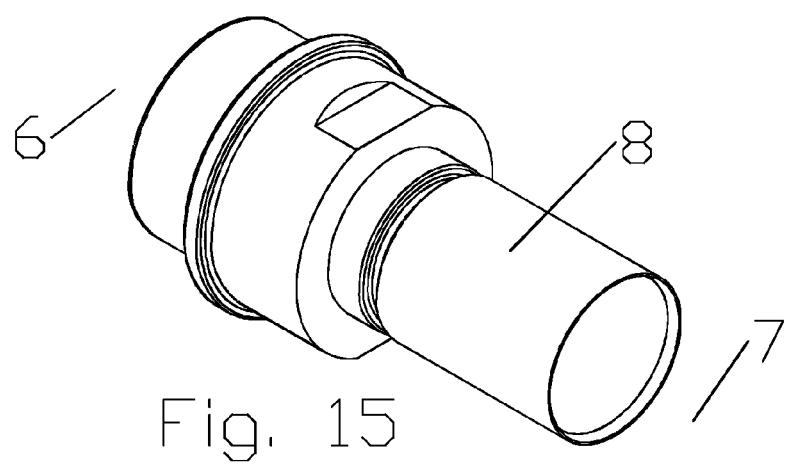
FIG. 15 is a schematic cutaway view of the connector body of the coaxial connector of FIG. 9.
Figure 16:
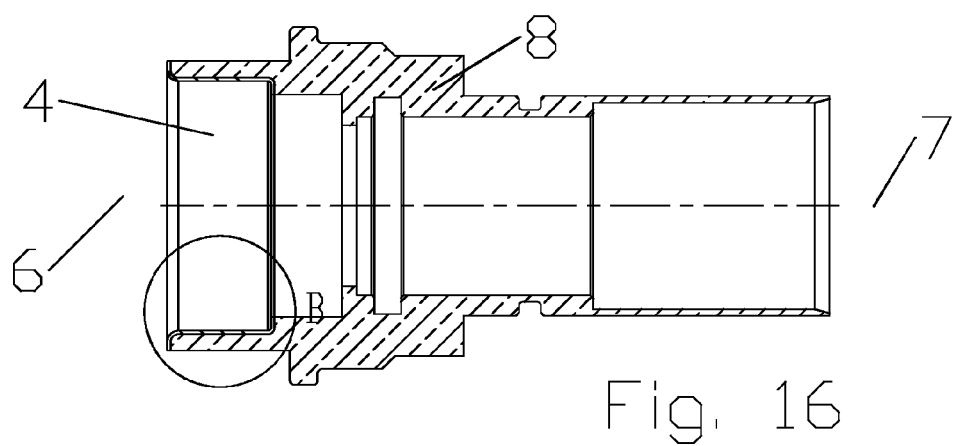
FIG. 16 is a schematic cutaway view of the connector body of FIG. 15.
Figure 17:
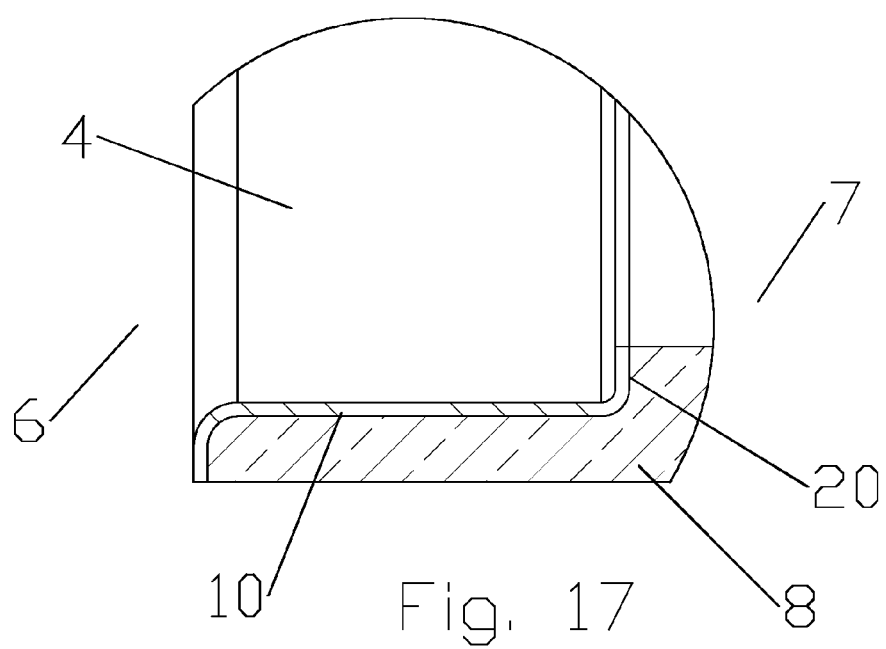
FIG. 17 is a schematic close-up view of area B of FIG. 17.

As shown in FIGS. 5-17, coaxial connector embodiments with a connection interface interconnectable with a mating connection interface demonstrated as a conventional 7/16 DIN female coaxial connector interface include an inner contact 34 (best shown in FIGS. 13 and 14) wherein the profile and dimensions of the interface end 6 are adapted so that when the interface surfaces of the inner contact 34 are covered by the inner conductor dielectric spacer 14, the outer diameter and profile of the inner conductor dielectric spacer 14 satisfies the 7/16 DIN male inner conductor mating dimension specifications. For example, in this embodiment, the inner conductor socket 26 according to the 7/16 DIN connection interface specification is provided as a spring basket 36 with spring fingers 38 biased radially inward to receive and grasp the outer diameter of the inner conductor dielectric spacer 14 therebetween.

Similarly, the dimensions of the interface shoulder 20 and male outer conductor coupling surface 10 are dimensioned such that when these are covered by the outer conductor dielectric spacer 4, the outer diameter and profile of the outer conductor dielectric spacer 4 satisfies the 7/16 DIN male outer conductor mating dimension specifications, seating coaxially adjacent the inner sidewall 22 of the annular groove 24 of the female connector body 18.

The outer conductor dielectric spacer 4 may be formed upon the male connector body 8 (see FIGS. 15-17) and the inner conductor dielectric spacer 14 formed upon the inner contact 34 also with an insulator 40 (see FIGS. 13 and 14), prior to final assembly seating of the insulator 40 (with inner contact 34 and inner conductor 16 attached) within the bore of the male connector body 8, to improve access to the corresponding surfaces during dielectric spacer formation.

One skilled in the art will appreciate that while the dielectric spacers have been demonstrated coupled to the conductor surfaces of the "male" portion of the pair of coaxial connectors 2, these dielectric spacers may be alternatively exchanged to seat upon the corresponding surfaces of the "female" connector as a known equivalent. Thereby, a female-type connector with a capacitive coupling connection interface may be interfaced with corresponding existing conventional male-type connectors to obtain the same PIM reduction benefit. Telescoping coaxial connection interfaces including a non-standard variation (FIGS. 1-4) and a 7/16 DIN (FIGS. 5-17) have been provided as exemplary embodiments. Other standardized and non-standard telescoping male or female connection interfaces may be similarly applied with the same result/benefits.

The application of capacitive coupling to the connection interface between male and female connector bodies 8, 18, enables reliable removable interconnectivity within an RF system wherein these interconnections are free of PIM. Coaxial coupling connectors adapted for mating with the standardized connection interface of existing coaxial connectors may enable cost efficient upgrade to new equipment and/or cabling providing the benefit of PIM free interconnections without requiring replacement and/or retrofitting of the entire RF system. Similarly, an RF system utilizing interconnections with a standardized capacitive coupled connector interface has the inherent flexibility of later being easily modified for operation with a conventional electromechanical interconnection should such become desired in view of changes to operating frequencies or the like.

| Table of Parts | |
|---|---|
| 2 | coaxial connector |
| 3 | connection interface |
| 4 | outer conductor dielectric spacer |
| 5 | mating connection interface |
| 6 | interface end |
| 7 | cable end |
| 8 | male connector body |
| 10 | outer conductor coupling surface |
| 12 | outer conductor |
| 13 | coaxial cable |
| 14 | inner conductor dielectric spacer |
| 15 | inner conductor coupling surface |
| 16 | inner conductor |
| 18 | female connector body |
| 20 | interface shoulder |
| 22 | inner sidewall |
| 24 | annular groove |
| 26 | inner conductor socket |
| 28 | releasable retainer |
| 30 | threads |
| 32 | retainer dielectric spacer |
| 34 | inner contact |
| 36 | spring basket |
| 38 | spring fingers |
| 40 | insulator |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A connector with a capacitively coupled connector interface for interconnection with a receiving portion provided with an inner sidewall, comprising:
    a connector body provided with an outer conductor coupling surface at an interface end;
    the outer conductor coupling surface covered by an outer conductor dielectric spacer;
    the outer conductor coupling surface dimensioned to seat spaced apart from the inner sidewall by the outer conductor dielectric spacer, when the connector body and the receiving portion are in an interlocked position; and
    a releasable retainer dimensioned to secure the connector body and the receiving portion in the interlocked position; the releasable retainer electrically isolated from the connector body by a retainer dielectric spacer.

2. The connector of claim 1, wherein the outer conductor coupling surface of the receiving portion abuts an interface shoulder of the connector body when the connector body and the receiving portion are in the interlocked position; the outer conductor coupling surface of the receiving portion spaced apart from the interface shoulder by the outer conductor dielectric spacer.

3. The connector of claim 1, wherein the receiving portion has a female 7/16 DIN connection interface.

4. The connector of claim 1, further including an inner conductor coupling surface at the interface end of the connector;
    an inner conductor dielectric spacer covering the inner conductor coupling surface;
    the inner conductor coupling surface at the interface end of the connector spaced apart from an inner conductor coupling surface of the receiving portion by the inner conductor dielectric spacer, when the connector body and the receiving portion are in the interlocked position.

5. The connector of claim 4, wherein the inner conductor surface is generally cylindrical.

6. A connector with a capacitively coupled connector interface for interconnection with a receiving portion provided with an inner sidewall, comprising:
    a connector body provided with an outer conductor coupling surface at an interface end;
    the outer conductor coupling surface covered by an outer conductor dielectric spacer;
    the outer conductor coupling surface dimensioned to seat spaced apart from the inner sidewall by the outer conductor dielectric spacer, when the connector body and the receiving portion are in an interlocked position; and
    a releasable retainer of dielectric material dimensioned to secure the connector body and the receiving portion in the interlocked position.

7. A connector with a capacitively coupled connector interface for interconnection with a receiving portion provided with an inner sidewall, comprising:
- a connector body provided with an outer conductor coupling surface at an interface end;
- the outer conductor coupling surface covered by an outer conductor dielectric spacer;
- the outer conductor coupling surface dimensioned to seat spaced apart from the inner sidewall by the outer conductor dielectric spacer, when the connector body and the receiving portion are in an interlocked position; and
- a releasable retainer dimensioned to secure the connector body and the receiving portion in the interlocked position; the releasable retainer and the receiving portion are provided with threads.

8. The connector of claim 7, wherein the threads of the releasable retainer are covered with a dielectric material.

9. A coaxial connector interface for interconnection with a mating connection interface, comprising:
- an outer conductor coupling surface and an inner conductor coupling surface;
- an outer conductor dielectric spacer covering the outer conductor coupling surface;
- an inner conductor dielectric spacer covering the inner conductor coupling surface;
- the outer conductor dielectric spacer and the inner conductor dielectric spacer insulating the outer conductor coupling surface and the inner conductor coupling surfaces, respectively, from direct contact with the mating connection interface.

10. The coaxial connector interface of claim 9, further including a releasable retainer provided with threads; the releasable retainer drawing the connector interface and the mating connection interface telescopically towards one another as the releasable retainer is rotated.

11. The coaxial connector interface of claim 10, wherein the releasable retainer is electrically isolated from the outer conductor coupling surface by a retainer dielectric spacer.

12. The coaxial connector interface of claim 10, wherein the releasable retainer is a dielectric polymer.

13. The coaxial connector interface of claim 10, wherein threads of the releasable retainer are coated with a dielectric material.

14. The coaxial connector interface of claim 9, wherein the mating connection interface seats against an interface shoulder of the coaxial connector interface, the interface shoulder covered by the outer conductor dielectric spacer.

15. The coaxial connector interface of claim 9, wherein the mating connection interface is a 7/16 DIN connection interface.

16. A method for manufacturing a connector with a capacitively coupled connector interface for interconnection with a receiving portion provided with a connection interface including a sidewall, comprising:
- providing a connector body with an outer conductor coupling surface at an interface end;
- covering the outer conductor coupling surface with an outer conductor dielectric spacer;
- the outer conductor coupling surface dimensioned to seat, spaced apart from the sidewall by the outer conductor dielectric spacer, when the connector body and the receiving portion are in an interlocked position; and
- providing a releasable retainer dimensioned to secure the connector body and the receiving portion in the interlocked position; wherein the releasable retainer does not galvanically interconnect the connector body with the receiving portion when the connector body and the receiving portion are in the interlocked position.

17. The method of claim 16, wherein the outer conductor dielectric spacer is ceramic material is applied by physical vapor deposition upon the outer conductor coupling surface.

18. The method of claim 16, further including providing an inner conductor coupling surface at the interface end of the connector;
- covering the inner conductor coupling surface with an inner conductor dielectric spacer;
- the inner conductor coupling surface spaced apart from an inner conductor coupling surface at an interface end of the receiving portion by the inner conductor dielectric spacer, when the connector body and the receiving portion are in the interlocked position.

* * * * *